United States Patent [19]
Gabas

[11] Patent Number: 5,199,132
[45] Date of Patent: Apr. 6, 1993

[54] HINGE FOR A SUN VISOR IN A MOTOR VEHICLE
[75] Inventor: Carlos Gabas, Barcelona, Spain
[73] Assignee: Industrias Techno-Matic, S.A., Calle Espronceda, Spain
[21] Appl. No.: 656,131
[22] PCT Filed: Jun. 27, 1990
[86] PCT No.: PCT/ES90/00022
  § 371 Date: Feb. 27, 1991
  § 102(e) Date: Feb. 27, 1991
[87] PCT Pub. No.: WO91/00190
  PCT Pub. Date: Jan. 10, 1991
[30] Foreign Application Priority Data
  Jul. 3, 1989 [ES] Spain ............................. 8902176
[51] Int. Cl.⁵ ................. E05C 17/64; E05D 11/08; B60J 3/00
[52] U.S. Cl. ................. 16/342; 296/97.9; 296/97.12
[58] Field of Search ......... 16/342; 296/97.9, 97.11, 296/97.12, 97.13

[56] References Cited
U.S. PATENT DOCUMENTS
4,707,019 11/1987 Ebert et al. ................. 296/97.9
5,007,622 4/1991 Gabas ......................... 296/97.12

FOREIGN PATENT DOCUMENTS
2234440 1/1974 Fed. Rep. of Germany.
1481372 7/1977 United Kingdom.
2154192 9/1985 United Kingdom ........... 296/97.12
2188365 9/1987 United Kingdom ........... 296/97.9

Primary Examiner—Robert L. Spruill
Assistant Examiner—Carmine Cuda
Attorney, Agent, or Firm—Michael J. Striker

[57] ABSTRACT

A hinge for motor vehicle sun visors formed in an L-shaped one-piece body member (1) including a the mechanical device (3,4) designed for receiving and retaining the corresponding free ends (2a, 2b) of the sun visor frame, having a longitudinal frame holder (3) for holding the free end (2a) of the frame (2) and longitudinal tabs (4) to hold the other free end (2b); reinforcement device designed to ensure the firm connection of the one-piece body member (1) with the sun visor body including fins (5 or 6, 7 or 9); and a connector (10) designed to receive an additional device (11,12) for holding and retaining the support shaft on which the sun visor is pivotably mounted. The additional device for holding and retaining the support shaft, which is located in the connector, can include a spring (11,12).

4 Claims, 1 Drawing Sheet

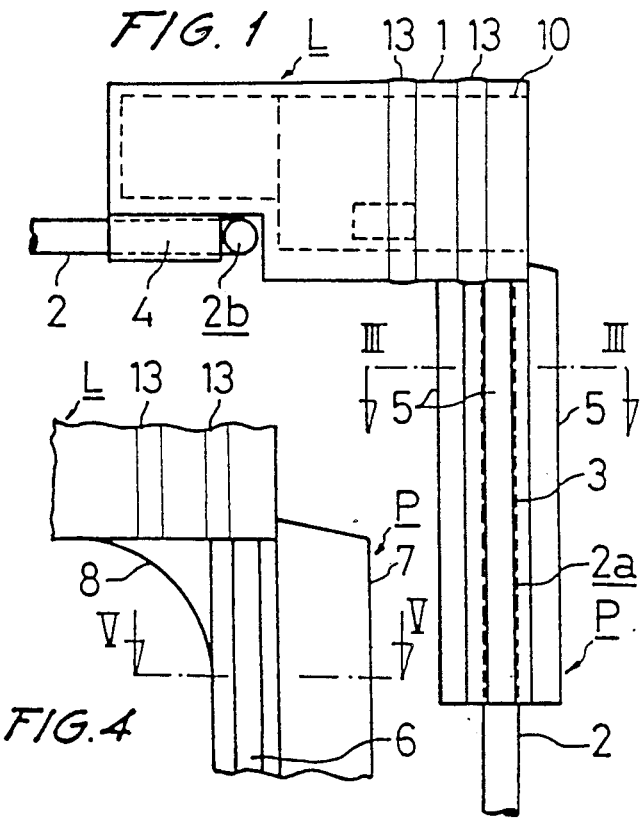
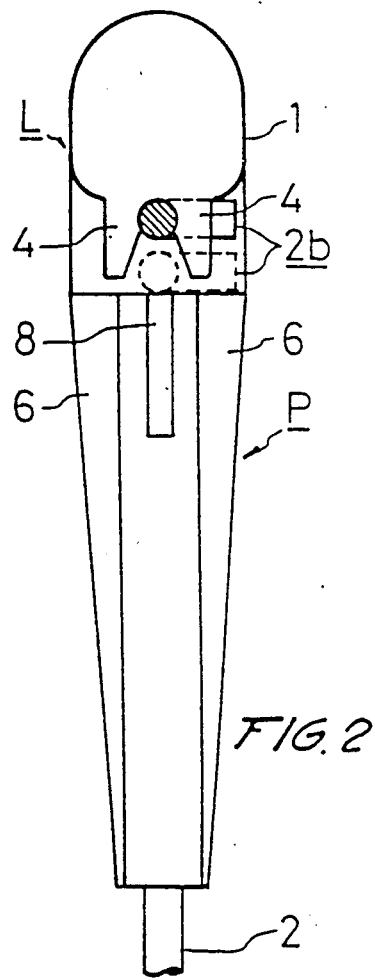
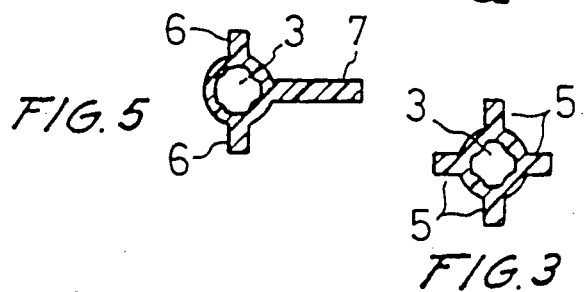
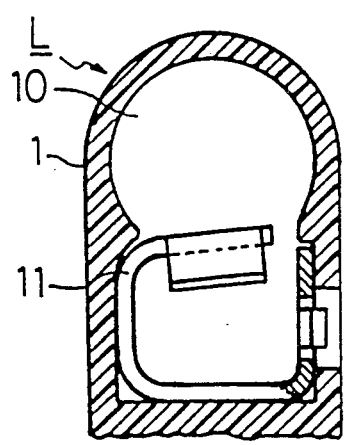
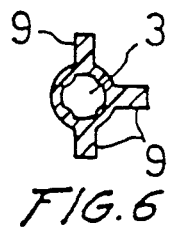
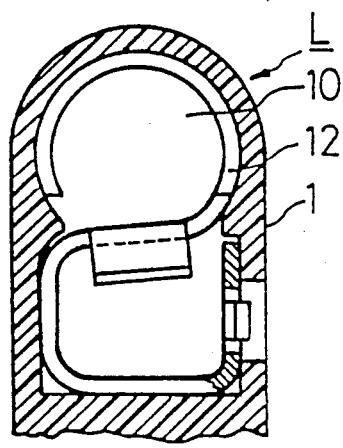

HINGE FOR A SUN VISOR IN A MOTOR VEHICLE

BACKGROUND OF THE INVENTION

The present invention relates to a hinge for motor vehicle sun visors designed for connecting the sun visor to the support shaft attached to the vehicle structure and on which said visor is pivotably mounted.

Mechanical devices are known which provide various solutions to the problem of connecting the sun visor with which motor vehicles are normally equipped and the support shaft attached to the vehicle structure on which they are pivotably mounted. The sun visor is formed by a sun visor body injection molded from materials such as, for example, polyurethane foam, which have a limited mechanical strength, and by a structure-reinforcing metal frame made from a rod, the perimeter of which coincides with and/or is adapted to the contour of the sun visor.

Among these known mounting devices are the devices described in the Spanish Patent Documents No. 276,823 "New hinge for motor vehicle sun visors" and No. 275,684 "Reinforced hinge for pivotably mounting motor vehicle sun visors". The Spanish Patent Document No. 276,823 teaches an injection molded plastics body member together with a metal rod forming the sun visor frame and having a spring to retain the support shaft on which the sun visor is pivotably mounted. Spanish Patent Document No. 275,684 teaches a body member also produced from plastics material mechanically attached to the metal rod forming the sun visor frame and which is externally provided with a retaining spring for the support shaft on which the sun visor is pivotably mounted.

These two prior Spanish Patent Documents Nos. 276,823 and 275,684 have as a common functional feature the fact that once the hinge is connected to the metal rod from which the sun visor structure-reinforcing frame is formed, it is not possible to separate both components, i.e., the hinge from the metal rod.

A design, which allows separation of the hinge from the rod after assembly, has been considered for the assembly stage when the material forming the sun visor body member has not yet been injection molded together with the metal rod attached to the hinge, but during the assembly process of such components. This is logically a notable drawback preventing optimization of the production processes and storage of finished product, with the resulting cost increase, since it prevents exchange of these components once they are assembled, when so required by the production process in order to adapt it to the current demand.

SUMMARY OF THE INVENTION

It is an object of the present invention to provide a hinge for mounting a sun visor in a motor vehicle, which avoids the above-mentioned disadvantage.

A hinge for mounting a sun visor pivotably on a support shaft in a motor vehicle according to the invention is disclosed herein. This hinge has an original design, structure and function, which permits it and the frame made of a metal rod of the sun visor to be coupled together prior to injection molding of the material forming the sun visor body.

According to the present invention, the hinge for mounting the sun visor comprises an essentially L-shaped one-piece body member preferably made from plastic materials having mechanical properties appropriate for each particular case of application, and having mechanical means designed for receiving the corresponding free ends of the open perimeter metal rod forming the sun visor frame; the reinforcement means designed to ensure the firm connection of the one-piece body with the sun visor body; and a connector designed to receive an additional means for holding and retaining the support shaft on which the sun visor is pivotably mounted.

The hinge for motor vehicle sun visors of the invention is further characterised in that the mechanical means designed for receiving the corresponding free ends of the open perimeter sun visor frame comprises: a longitudinal frame holder disposed in the side of the one-piece body member extending perpendicularly to the axis of pivoting of the sun visor and in which the corresponding free end of the the frame may be slidingly snugly inserted to a sufficient extent; and by longitudinal tabs for holding and retaining the other free end of the the frame which are formed on the side of the one-piece body member extending longitudinally to the axis of pivoting of the sun visor. It is a further feature of the hinge for motor vehicle sun visors that the mechanical reinforcement means designed for ensuring the firm attachment of the one-piece body member to the sun visor body member is formed on the side of the one-piece body member extending perpendicularly to the axis of pivoting of the sun visor and comprises a plurality of suitably dimensioned fins disposed on the perimeter of the extension.

The hinge for motor vehicle sun visors of the invention is further characterised in that the housing designed for receiving the additional means for holding and retaining the support shaft on which the sun visor is pivotably mounted is formed on the side of the one-piece body member extending longitudinally of the axis of pivoting of the sun visor and is suitably dimensioned to receive springs having a shape and mechanical properties variable in accordance with each particular case of application.

BRIEF DESCRIPTION OF THE DRAWING

The hinge for motor vehicle sun visors of the invention is illustrated in the drawing sheet accompanying the present description, in which:

FIG. 1 is a front view of a hinge according to the invention attached to the sun visor frame.

FIG. 2 is a side view of the hinge according to the invention connected to the the frame.

FIG. 3 is a cross section view of the hinge of FIG. 1 taken along the line III—III of FIG. 1.

FIGS. 4 is a detailed front view of a portion of another embodiment of a hinge according to the invention.

FIG. 5 is a cross section view of the hinge of FIG. 1 taken along the line V—V of FIG. 4.

FIG. 6 is a cross section view of another embodiment of a hinge according to of the invention.

FIGS. 7 and 8 are views, partly in section, of the hinge according to the invention incorporating different springs for holding and retaining the support shaft (not shown in the figures) on which the sun visor is pivotably mounted.

DETAILED DESCRIPTION OF THE PREFERRED EMBODIMENTS

One example of a hinge according to the invention is formed as shown in FIG. 1 of the accompanying drawing by a one-piece L-shaped body member 1, preferably made from plastics materials having mechanical properties appropriate for each particular application.

In the body member 1 there is mechanical means designed to receive the free ends of the metal frame 2 having an open perimeter with free ends 2a and 2b and which is shown in part in FIGS. 1 and 2. The frame 2 for the sun visor can be made from a metal rod, which is bent or otherwise formed in the appropriate shape.

On side P of the body member 1, which as shown in FIGS. 1, 2 and 4 extends perpendicularly to the axis A of pivoting of the sun visor mounted on support shaft S, there is formed a longitudinal frame holder 3 in which the free end 2a of the metal frame 2. The frame holder 3 is structured so that the free end 2a may be slidingly snugly inserted to a sufficient extent.

A connector 10, from which the frame holder 3 extends, is located on the other side L of the body member 1. Two longitudinal tabs 4 are provided on the sun-visor-facing portion of the connector 10 of the L-shaped body member 1, which as shown in FIGS. 1, 2 and 4 extends longitudinally to the axis A of pivoting of the sun visor body. The free end 2b of the metal frame 2 is releasably held between these two longitudinal tabs 4 against the connector 10. This free end 2b has an L-shaped bend 21, as shown in FIGS. 1 and 2, so that once it is inserted between the longitudinal tabs 4 no longitudinal movement of the free end 2b and, consequently, of the metal frame 2 is possible.

Mechanical means for holding the free ends 2a, 2b of the frame includes therefore the longitudinal frame holder 3 and the two longitudinal tabs 4 on the body member 1. This firm attachment is releasable, and at any time prior to injection molding of the material forming the sun visor body, the body member 1 and the metal frame 2 can be easily separated from one another even without the aid of tools.

A reinforcement means for the hinge for motor vehicle sun visors of the invention is formed on the side P of the body member 1, as shown in FIGS. 1, 2, 3, 4, 5 and 6 of the accompanying drawing.

According to one embodiment, shown in FIGS. 1 and 3, the reinforcement means is formed by four evenly distributed, constant section fins 5 extending coextensively with the side P of the body member 1.

According to another embodiment, shown in FIGS. 2, 4 and 5, the reinforcement means comprises two tapering fins 6 and a constant section fin 7 which is larger than the former, said fins 6 and 7 extending coextensively with the side P of the body member 1. The reinforcement means also comprises, in this case, the gusset 8 acting as support member for the side L of the body member 1. According to the preferred embodiment illustrated in FIG. 6, the reinforcement means comprises three constant section fins 9 extending coextensively with the side L of the body member 1.

The selection of one embodiment or another of the above described reinforcement means of the hinge of the invention will depend in each particular case of application on the mechanical demands contemplated in terms of the shape and integral composition of the sun visor.

The connector 10 contains additional holding and retaining means for the support shafts on which the sun visor is pivotably mounted and, obviously, to a sufficient extent, the support shaft itself, as shown in FIGS. 1, 7 and 8 of the accompanying drawing.

FIGS. 7 and 8 show the longitudinal connector 10 which, in the embodiment described here, is dimensioned to house at least the spring 11 according to Spanish Patent Document 292,644, of the same applicant, as shown in FIG. 7, or the spring 12 corresponding to Spanish Patent 8900980, also of the same applicant, as shown in FIG. 8.

The spring 11 acts as a holding and retaining means for the support shafts on which the sun visor is pivotably mounted in cases where the mechanical demands on the sun visor in the form of moments acting on the support shaft are small and; in particular, less than 1.2 Nm, while the use of spring 12 will be required in the cases where the moments are in excess of the aforesaid value of 1.2 Nm.

The two circumferentially reinforcing bands 13, which are formed in the side L of the body number 1 as shown in FIGS. 1 and 4 of this embodiment, are for conferring a greater structural strength on the longitudinal connector 10 which, as stated above, is designed to hold the holding and retaining means for the support shafts on which the sun visor is pivotably mounted as well as the support shaft itself.

It will be understood that each of the elements described above, or two or more together, may also find a useful application in other types of structures differing from the types described above.

While the invention has been illustrated and described as embodied in a hinge for a sun visor in a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and is desired to be protected by Letters Patent is set forth in the appended claims:

1. A hinge for a motor vehicle sun visor having a sun visor body and a frame with an open perimeter and two free ends, the hinge comprising an essentially L-shaped, one-piece body member; a longitudinal frame holder located on a side of said body extending perpendicularly to an axis of pivoting of the sun visor body and formed so that one of the free ends of the frame fits snugly and slidingly therein; at least two longitudinal tabs for holding and retaining another of free ends of the frame and located on a side of the body member extending longitudinally to the axis of pivoting of the sun visor; a connector formed by a portion of said body member for pivotally supporting the sun visor in the motor vehicle and designed to receive additional means for holding and retaining a motor vehicle support shaft on which said body member is mounted; reinforcement means on said body member for making a firm connection between said body member and the sun visor body, said reinforcement means including a plurality of fins provided on said frame holder, said fins being coextensive with said frame holder and extending in two directions which are perpendicular to one another as seen in a cross section which is perpendicular to an elongation of said frame holder.

2. A hinge according to claim 1, wherein said fins include at least one first fin which has a tapering cross-section and at least one second fin which has a constant cross-section, said fin with tapering cross-section extending perpendicularly to said fin with a constant cross-section.

3. A hinge according to claim 1, wherein said reinforcement means also includes a gusset which acts as a support member for said body member.

4. A hinge for a motor vehicle sun visor having a sun visor body and a frame with an open perimeter and two free ends, the hinge comprising an essentially L-shaped, one-piece body member; a longitudinal frame holder located on a side of said body member extending perpendicularly to an axis of pivoting of the sun visor body and formed so that one of the free ends of the frame fits snugly and slidingly therein; at least two longitudinal tabs for holding and retaining another of free ends of the frame and located on a side of the body member extending longitudinally to the axis of pivoting of the sun visor; a connector formed by a portion of said body member for pivotally supporting the sun visor in the motor vehicle and designed to receive additional means for holding and retaining a motor vehicle support shaft on which said body member is mounted; reinforcement means on said body member for making a firm connection between said body member and the sun visor body, said reinforcement means including a plurality of fins provided on said frame holder, said fins being coextensive with said frame holder and extending in two directions which are perpendicular to one another as seen in a cross section which is perpendicular to an elongation of said frame holder; and means for releasably holding and retaining the support shaft in said connector and including at least one spring having a shape and mechanical properties so as to feed in and to be received in said connector and so as to engage and hold the supporting shaft when said connector is placed on the supporting shaft.

* * * * *